(No Model.)
W. S. MOODY.
SYSTEM OF ELECTRIC DISTRIBUTION.
No. 508,898. Patented Nov. 14, 1893.
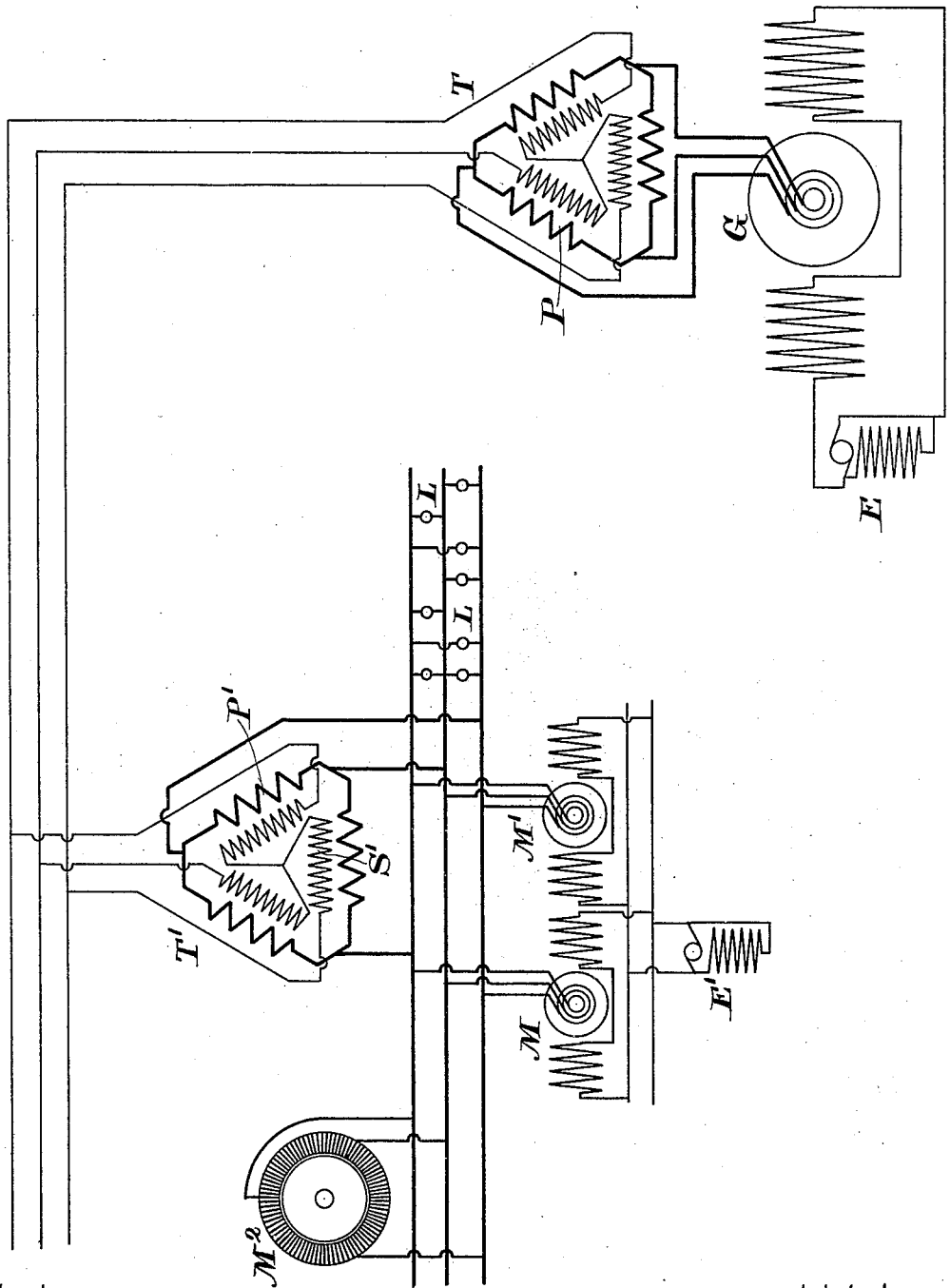
Witnesses—
Alec F. Macdonald.
J. S. Johnston.
Inventor—
Walter S. Moody,
by Bentley and Blodgett,
Attys.

UNITED STATES PATENT OFFICE.

WALTER S. MOODY, OF LYNN, ASSIGNOR TO THE GENERAL ELECTRIC COMPANY, OF BOSTON, MASSACHUSETTS.

SYSTEM OF ELECTRIC DISTRIBUTION.

SPECIFICATION forming part of Letters Patent No. 508,898, dated November 14, 1893.

Application filed March 17, 1893. Serial No. 466,477. (No model.)

*To all whom it may concern:*

Be it known that I, WALTER S. MOODY, a citizen of the United States, residing at Lynn, in the county of Essex and State of Massachusetts, have invented certain new and useful Improvements in Systems of Electric Distribution, of which the following is a specification.

My invention relates to a multiphase system of distribution, that is, one in which alternating currents differing in time phase are used to feed electric motors, lights, &c., and more particularly to the transmission of such currents over long distances, in which case the potential must be very high in order to save copper or loss of energy; to which end I adopt a particular connection of the primary and secondary windings of the potential-raising and potential-reducing transformers, as will be described.

In the present case the use of three-phase currents will alone be referred to, but it is to be understood that the connections to be described are applicable to any case where poly-phase currents, three, four or more—are used, which currents are conveyed to a distance at high potential and there transformed into similar currents of lower potential.

There are two principal methods of connecting a three-phase transformer, one of which is technically known as the $\triangle$ or "mesh" method and the other as the Y or "star" method. In the former the three coils of the transformer are arranged in series, and the three-phase conductors are led, respectively, to the junction between the coils, or in other words, each one of the three-phase conductors is connected to one end of each of two coils of the transformer. In the Y or "star" method of connection the three-phase conductors are respectively connected each to one of the ends of the three coils of the transformer, and the other terminals of the coils are united to form a common joint or connection. In the transmission of large powers by the poly-phase system of electric distribution, the primary or generated current is usually of moderate potential and very large volume. It may be, for instance, of one hundred to five hundred volts potential, and the current may be very large, even as high as a thousand ampères or more, if desired. The secondary winding of a transformer adapted to such service will be such as to give an exceedingly high potential, if the distance over which the current is to be conveyed is great.

In the construction of transformers there are certain sizes of wire which it is more economical to use than other sizes, the selection depending upon ease of manipulation and initial cost of the wire. For example, it is not economical to use very heavy wires, because it is difficult to bend them in winding a transformer; and, on the other hand, it is not economical to use extremely fine wire, because the first cost is high and it requires a long time to wind coils of the very many convolutions required with such wire. Other reasons for not having the high potential winding of extremely fine wire are that larger wire is not so readily broken, the turns are more easily insulated from each other, and more of the available space is filled with copper instead of insulation, thus increasing the efficiency of the transformer.

In my invention I connect the low potential windings by the $\triangle$ or "mesh" method. In this case when the current is at its maximum in any one of the three conductors it divides equally between two coils of the transformer, or passes through the two coils in multiple, and returns on the other two conductors. This permits the use of a smaller wire for the low potential winding than if the Y or "star" method of connection were employed. On the other hand, the high potential windings of the transformers are made by the Y method. Here the maximum potential between the two terminals of any one of the three coils of the transformer, that is between one of terminals connected to line and the point of common connection, is expressed by the equation $P = \frac{p}{\sqrt{3}}$, in which P represents the maximum difference of potential between the terminals of any one of the transformer coils and $p$ is the potential difference between any two of the three-phase line conductors at the same instant. In other words, when the current in any one conductor is at its maximum it is flowing through one coil of the transformer and thence through the other two in multiple, thus reducing the potential around the first coil, and also permitting a coarser wire to be used in the winding than with the △ or "mesh" method of connection.

It will thus be seen that the construction employed in my invention gives the following advantages: the size of the wire of the low potential winding is diminished as far as possible, while the size of the wire of the high potential winding is increased as far as possible. Better insulation is also secured on the high potential coils, by reason of the reduction of potential at their terminals.

The drawing hereunto annexed and made a part of this specification shows diagrammatically an embodiment of my invention.

G is a generator of multiphase alternating currents, of ordinary construction, in which E is a separate exciter of the field magnet coils applied in the usual way.

T is a "step-up" transformer having its low-potential circuit P wound by the △ or "mesh" system, as herein described, while its high potential circuit is wound by the Y or "star" system and connected to phasal or three-phase line conductors leading to a "step-down" transformer T', also having its low-potential circuit P' wound upon the △ or "mesh" system and its high-potential circuit S' wound by the Y or "star" system. To the coils P' are connected suitable mains leading to any translating devices desired, such as lamps L L, synchronous motors M M', whose field-magnet coils are energized by the separate exciter E', or by a portion of the current commuted from their own armatures; and M² represents a non-synchronous motor.

Having thus described my invention, what I claim, and wish to protect by Letters Patent of the United States, is—

1. In a system of electric distribution, a generator of multiphase currents, a "step-up" transformer having its low potential coils wound upon the △ or "mesh" system and its high-potential coils wound upon the Y or "star" system, and line connections from such transformer to a step-down transformer similarly wound and having its low potential coils connected to mains which include translating devices.

2. The method of winding transformers for use in multiphase systems of electric distribution which consists in connecting the low-potential coils by the △ or "mesh" system, and connecting the high-potential coils by the Y or "star" system, substantially as described herein.

3. A transformer for multiphase systems of electric distribution, having its low-potential coils wound on the △ or "mesh" system, and its high potential coils wound upon the Y or "star" system.

In witness whereof I have hereunto set my hand this 14th day of March, 1893.

WALTER S. MOODY.

Witnesses:
JOHN W. GIBBONEY,
BENJAMIN B. HULL.